United States Patent
Mariswamy et al.

(10) Patent No.: US 9,696,887 B2
(45) Date of Patent: *Jul. 4, 2017

(54) INTEGRATED USER INTERFACE USING LINKED DATA

(71) Applicant: International Business Machines Corporation, Armonk, NY (US)

(72) Inventors: Harshini Mariswamy, Bangalore (IN); Arun Ramakrishnan, Chennai (IN); Rohit Shetty, Bangalore (IN); Nalini Vidapankal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,447

(22) Filed: Sep. 2, 2014

(65) Prior Publication Data

US 2015/0089412 A1 Mar. 26, 2015

Related U.S. Application Data

(63) Continuation of application No. 14/032,673, filed on Sep. 20, 2013.

(51) Int. Cl.
*G06F 3/0484* (2013.01)
*G06F 3/0481* (2013.01)
*G06F 9/44* (2006.01)

(52) U.S. Cl.
CPC ........ *G06F 3/04842* (2013.01); *G06F 3/0481* (2013.01); *G06F 9/4443* (2013.01); *G06F 9/4445* (2013.01)

(58) Field of Classification Search
None
See application file for complete search history.

(56) References Cited

U.S. PATENT DOCUMENTS

| | | | | |
|---|---|---|---|---|
| 2004/0267441 | A1* | 12/2004 | Kim | G01C 21/26 701/410 |
| 2005/0182563 | A1* | 8/2005 | Adamski | G01C 21/3679 701/438 |
| 2010/0037243 | A1 | 2/2010 | Mo et al. | |
| 2011/0041078 | A1 | 2/2011 | Park et al. | |
| 2013/0047148 | A1* | 2/2013 | Lui | G06F 8/65 717/173 |
| 2015/0089405 | A1 | 3/2015 | Mariswamy et al. | |

FOREIGN PATENT DOCUMENTS

CN 104462175 A 3/2015

OTHER PUBLICATIONS

TomTom One (TomTom One Manual, 2006).*
IBM, "iWidget Overview," date printed Jul. 2, 2013, <http://pic.dhe.ibm.com/infocenter/radhelp/v7r5/index.jsp?topic=%2Fcom.ibm.etools.webtools.gadgets.doc%2Ftopics%2Fciwidget.html>.
U.S. Appl. No. 14/032,673, filed Sep. 20, 2013, entitled: "Integrated User Interface Using Linked Data".

* cited by examiner

Primary Examiner — Michelle Chin
(74) Attorney, Agent, or Firm — Reza Sarbakhsh

(57) ABSTRACT

A computer receives user input regarding at least a first and a second resource. The computer retrieves navigational content for the first and second resource. The computer displays the retrieved navigational content in a single interface. The computer receives user selection of at least one element of the retrieved navigational content. The computer then retrieves page content associated with the selected at least one element of the retrieved navigational content.

2 Claims, 3 Drawing Sheets

INTEGRATED USER INTERFACE USING LINKED DATA

CROSS REFERENCE TO RELATED APPLICATION

This application is a Continuation Application of pending U.S. patent application Ser. No. 14/032,673 filed Sep. 20, 2013.

FIELD OF THE INVENTION

The present invention relates generally to user interfaces, and more particularly to creating and providing an integrated user interface which integrates multiple user interface pages into a single user interface.

BACKGROUND

In today's information technology (IT) environment, IT solutions play an important role as they help to deploy solutions faster, reduce cost, and provide direct solutions to customers based on their requirements. Managing and administering an IT solution often time involves multiple products, and also the configuration of each product and the integration between the products. In order to perform configuration and integration of multiple products for an IT solution, a user or administrator may be required to traverse across multiple disparate user interfaces from multiple servers to view a status or perform operations. This can slow down work and lead to mistakes.

Currently, there is no way for an administrator to obtain an integrated user interface within the context of a distributed IT environment. Using current methods, in order to view the user interface in an integrated manner, it would be necessary to deploy all the relevant products or at least the user interface applications of each product in a single server. A single server deployment of user interface components of each product is impractical due to performance considerations and dependency issues.

SUMMARY

Embodiments of the present invention provide a system, method, and program product for creating an integrated user interface. A computer receives user input regarding at least a first and a second resource. The computer retrieves navigational content for the first and second resource. The computer displays the retrieved navigational content in a single interface. The computer receives user selection of at least one element of the retrieved navigational content. The computer then retrieves page content associated with the selected at least one element of the retrieved navigational content.

DETAILED DESCRIPTION

Figure 1:
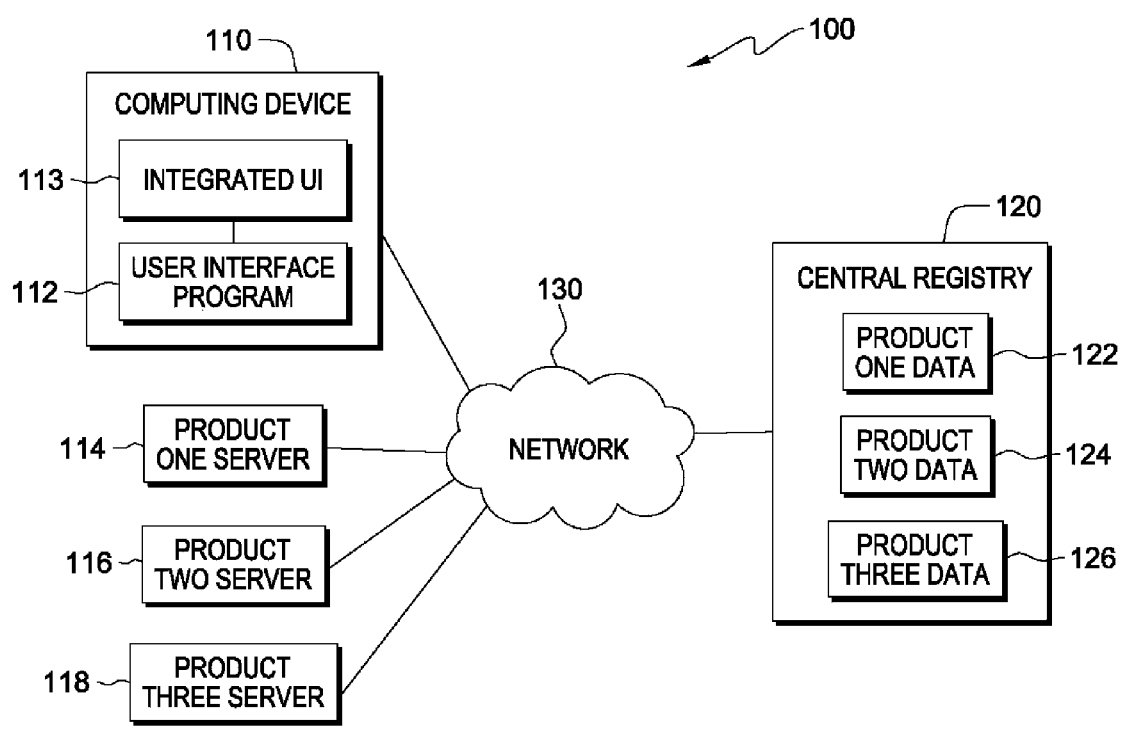
FIG. 1 illustrates an integrated user interface system, in accordance with an embodiment of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code/instructions embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

FIG. 1 illustrates integrated user interface system 100, in accordance with an embodiment of the invention. Integrated user interface system 100 includes computing device 110, central registry 120, product one server 114, product two server 116, and product three server 118, all interconnected over network 130.

In an exemplary embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110, central registry 120, product one server 114, product two server 116, and product three server 118.

Product one server 114 may be a desktop computer, a notebook, a laptop computer, a tablet computer, a handheld device, a smart-phone, a thin client, or any other electronic device or computing system capable of receiving and sending data to and from other computing devices via network 130. In the exemplary embodiment, product one server 114 is a computing device that is optimized for support of network requests related to data regarding a product, product one, which resides on the server. For example, product one server 114 may be a server or cluster of servers dedicated to responding to network requests related to Tivoli® (Tivoli is a registered trademark of IBM Corp.), in which case Tivoli would be product one. Although not shown, optionally, product one server 114 can comprise a cluster of web servers executing the same or similar software to collectively process network requests as distributed by a front end server and a load balancer. Product one server 114 is described in more detail with reference to FIG. 3.

Product two server 116 may be a desktop computer, a notebook, a laptop computer, a tablet computer, a handheld device, a smart-phone, a thin client, or any other electronic device or computing system capable of receiving and sending data to and from other computing devices via network 130. In the exemplary embodiment, product two server 116 is a computing device that is optimized for support of network requests related to data regarding a product, product two, which resides on the server. Although not shown, optionally, product two server 116 can comprise a cluster of web servers executing the same or similar software to collectively process network requests as distributed by a front end server and a load balancer. Product two server 116 is described in more detail with reference to FIG. 3.

Product three server 118 may be a desktop computer, a notebook, a laptop computer, a tablet computer, a handheld device, a smart-phone, a thin client, or any other electronic device or computing system capable of receiving and sending data to and from other computing devices via network 130. In the exemplary embodiment, product three server 118 is a computing device that is optimized for support of network requests related to data regarding a product, product three, which resides on the server. Although not shown, optionally, product three server 118 can comprise a cluster of web servers executing the same or similar software to collectively process network requests as distributed by a front end server and a load balancer. Product three server 118 is described in more detail with reference to FIG. 3.

Central registry 120 includes product one data 122, product two data 124, and product three data 126. In the exemplary embodiment, central registry 120 may be a desktop computer, a notebook, a laptop computer, a tablet computer, a handheld device, a smart-phone, a thin client, or any other electronic device or computing system capable of receiving and sending data, such as product registration information, to and from other computing devices via network 130. Although not shown, optionally, central registry 120 can comprise a cluster of web servers executing the same or similar software to collectively process network requests as distributed by a front end server and a load balancer. Central registry 120 is described in more detail with reference to FIG. 3.

Product one data 122, product two data 124, and product three data 126 are data sets which include registry information for each respective product. Registry information includes an identifier of the product/resource such as a name, a unique number assigned to the product, or a URL for the product, dependencies/relationships to other products, and additional URLs for retrieval of other information relevant to the product, such as for configuration purposes.

Computing device 110 includes user interface program 112 and integrated user interface 113. In the exemplary embodiment, central registry 120 may be a desktop computer, a notebook, a laptop computer, a tablet computer, a handheld device, a smart-phone, a thin client, or any other electronic device or computing system capable of receiving and sending data, such as product registration information, to and from other computing devices via network 130. Although not shown, optionally, central registry 120 can comprise a cluster of web servers executing the same or similar software to collectively process network requests as distributed by a front end server and a load balancer. Central registry 120 is described in more detail with reference to FIG. 3.

In the exemplary embodiment, integrated user interface 113 includes components used to receive input from a user and transmit the input to an application residing on computing device 110. In an exemplary embodiment, integrated user interface 113 uses a combination of technologies and devices, such as device drivers, to provide a platform to enable users of computing device 110 to interact with user interface program 112. In the exemplary embodiment, integrated user interface 113 receives input, such as textual input received from a physical input device, such as a keyboard, via a device driver that corresponds to the physical input device.

User interface program 112 is a program capable of receiving and sending data, such as data related to product one, two, and/or three, to other computing devices via network 130. In the exemplary embodiment, user interface program 112 may then display the data, which may include things such as navigational content or page content, to the user of computing device 110 via integrated user interface 113. The integrated user interface is also capable of receiving user input, such as user login information, via integrated user interface 113, and then verifying whether the user is eligible for access to certain data.

Figure 2:
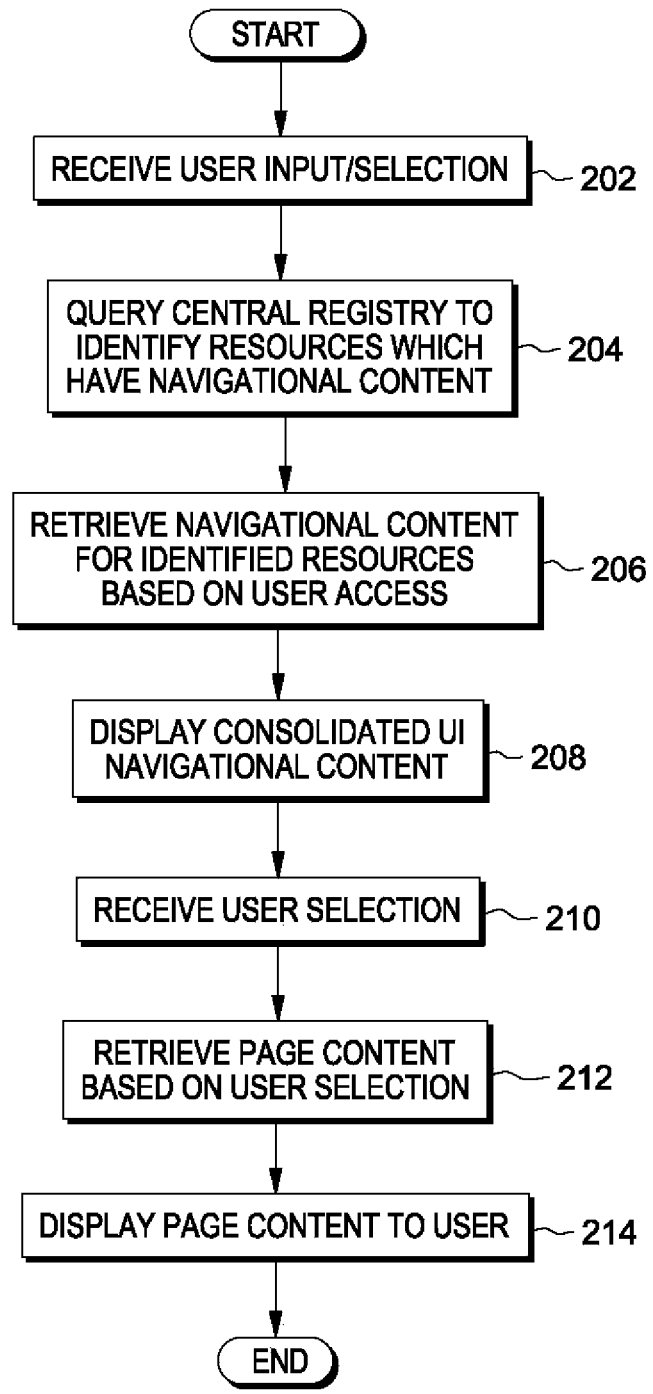
FIG. 2 is a flowchart illustrating the operations of integrated user interface program of FIG. 1, in accordance with an embodiment of the invention.

FIG. 2 shows a flowchart illustrating the operations of user interface program 112 in forming an integrated user interface, in accordance with an exemplary embodiment of the invention. In the exemplary embodiment, user interface program 112 receives user input or a user selection for content of one or more resources or products via integrated user interface 113 (step 202). For example, in an IT environment consisting of IBM Tivoli and Netcool® (Netcool is a registered trademark of IBM Corp.), a user may be interested in viewing content to get assistance in administration and configuration in order to configure IBM Tivoli to forward events to Netcool. In this example, user interface program 112 receives input or a user selection for the products Tivoli and Netcool (input regarding assistance with configuration and administration is received at a later time), via integrated user interface 113. In other embodiments, user interface program 112 receives user input regarding specific content for one or more resources via integrated user interface 113. In this other embodiment, referring to the example above, user interface program 112 receives input or a user selection for assistance with configuration and administration for the products Tivoli and Netcool. In addition, in the exemplary embodiment, user interface program 112 also receives user login information from the user of computing device 110. The relevance and application of the user login information is described in greater detail below. In yet another embodiment, user interface program 112 does not receive any input or user selection.

User interface program 112 then queries central registry 120 to identify the resources which have navigational content (step 204). In the exemplary embodiment, central registry 120 contains data regarding an assortment of products/resources including: an identifier of the product such as a name, a URL, or a unique number assigned to the product; a URL or URLs which contain additional information regarding navigational content, configuration, administration, or other product information; and also relationship/dependency data. Relationship/dependency data describes relationships between products. For example, a product may be dependent on another product, such as, a product may use a component of another product or information from another product, or may be fully or partially integrated with another product. This relationship/dependency information is stored in association with the relevant product in the form of data stating the relationship between products. For example, relationship information stored in association with product one may state that product one uses a component of product two, or may provide a URL link to product 2 which provides the relevant dependency information. In this example, relationship information stored in association with product two also contains information regarding the relationship between product one and product two. In this step, user interface program 112 identifies the resources, relevant to the user selection, which have navigational content. Certain products with information stored in central registry 120 may not have navigational content. In the exemplary embodiment, user interface 112 analyzes the product data, with regard to the products relevant to the user selection, stored in central registry 120 to determine if the product has a URL or link to navigational content for the product.

User interface program 112 then retrieves navigational content for the products identified to have navigational content from the relevant product servers (step 206). For example, if user interface program 112 receives user selection for assistance with administration and configuration with regard to product one, product two and product three, user interface program 112 analyzes product one data 122, product two data 124, and product three data 126 stored in central registry 120 and determines if each product has navigational content. If user interface program 112 determines that product one and product two have navigational content, but product three does not, user interface program 112 retrieves navigational content for product one and product two from product one server 114 and product two server 116, respectively. In other embodiments, if user interface program 112 does not receive user input, user interface program 112 retrieves navigational content for all resources identified to have navigational content, rather than limiting retrieval based on user input or selection.

In addition, while retrieving navigational content, user interface program 112 simultaneously verifies if the user has access to the target pages (pages that can be accessed from the navigational content) by comparing the user login information to a repository. In the exemplary embodiment, each product server has a repository which states which users have access to the content available on the server. For example, a user may have access to the product one administrative content available on the product one server but may not have access to the product one configuration content. In this case, user interface program 112 only retrieves navigational content for the administrative content for product one from product one server 114. In other embodiments, user interface program 112 may retrieve navigational content for product content that the user may not have access to; however, user interface program 112 may return a blank page or empty response if user selection of such navigational content is made. Referring to the example above, in this other embodiment, if a user does not have access to product one configuration content, user interface program 112 may still retrieve navigational content for product one configuration content; however, if the user subsequently selects an element of the product one configuration navigational content, user interface program 112 does not retrieve the corresponding page content and returns an empty or blank response.

User interface program 112 then consolidates the retrieved navigational content and displays the content to the user of computing device 110 via integrated user interface 113 (step 208). In the exemplary embodiment, user interface program 112 takes dependencies between products into account when displaying the consolidated navigational content to the user. For example, if product two is dependent on product one, user interface program 112 may add the navigational contents of product two as a component or a sub menu of the product one navigational contents, essentially presenting the relationships between the products to the user. In addition, if the dependency information specifies that a particular aspect of product two is dependent on product one, then user interface program 112 may present the navigational contents to reflect this dependency. For example, if the dependency information specifies that product two depends on product one and the dependency is tagged as "event forwarding", then only pages that have the tag "event forwarding" may be shown in the product two sub menu of the product one navigational contents.

User interface program 112 then receives user selection of at least one element of the retrieved navigational content via integrated user interface 113 (step 210). In the exemplary embodiment, the displayed navigational content provides links or selectable options to specific page content. Therefore, user selection of at least one element of the retrieved navigational content is based on the portion of the product the user is interested in.

User interface program 112 then retrieves the page content from the product server based on the user selection (step 212). For example, if the user is interested in product one and product two, based on user input, user interface program 112 retrieves the navigational content for product one and product two from the respective product servers and presents the content to the user via integrated user interface 113. If the user then selects the "configuration" selectable option for product one from the navigational content, user interface program 112 retrieves the "configuration" page content from the product one server 114. In the exemplary embodiment, user interface program 112 then displays the retrieved page contents to the user via integrated user interface 113 (step 214).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

Figure 3:
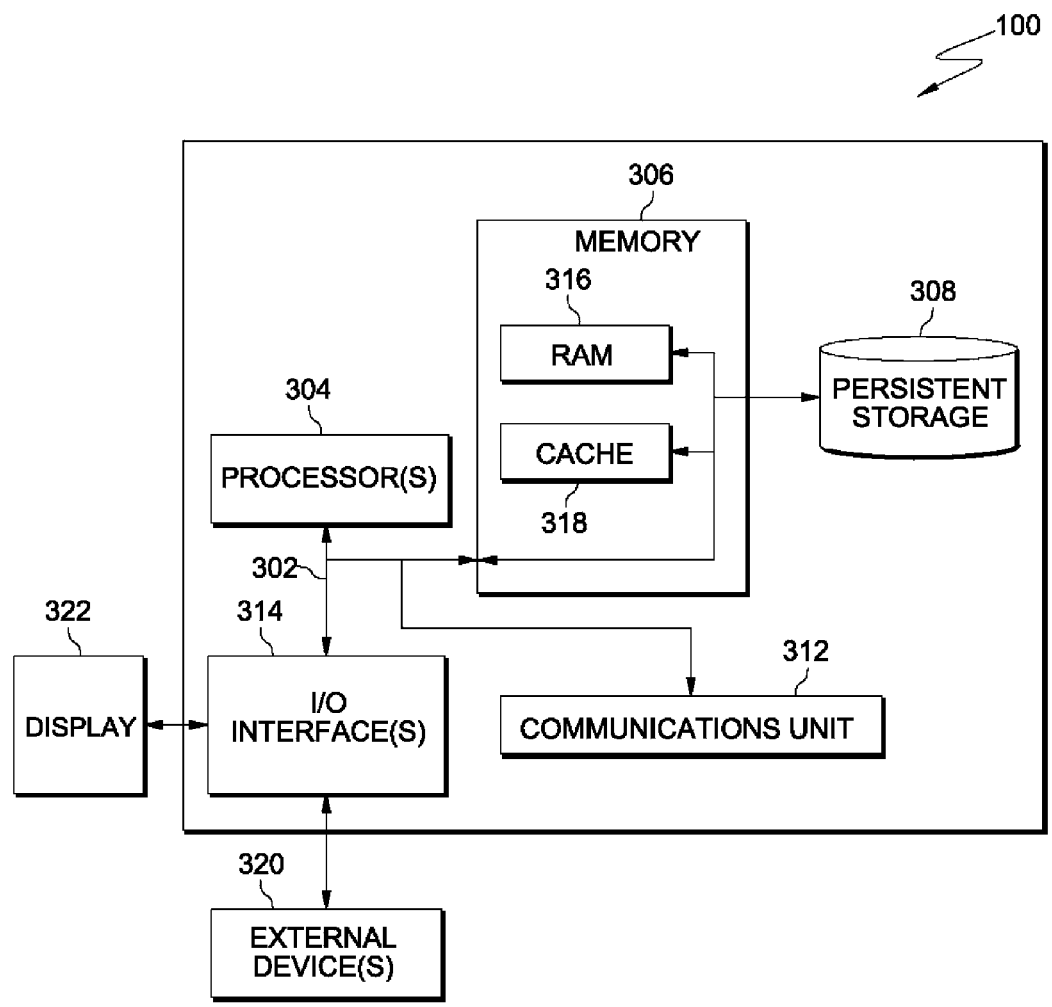
FIG. 3 is a block diagram depicting the hardware components of the integrated user interface system of FIG. 1, in accordance with an embodiment of the invention.

FIG. 3 depicts a block diagram of components of computing device 110 and server 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and server 120 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The one or more operating systems and programs, integrated user interface 113, and user interface program 112 in computing device 110; and the one or more operating systems and program product one data, product two data, and product three data in central registry 120, are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 08.

Communications unit 312, in these examples, provides for communications with other data processing systems or devices. In these examples, communications unit 312 includes one or more network interface cards. Communications unit 312 may provide communications through the use of either or both physical and wireless communications links. The programs, integrated user interface 113, and user interface program 112 in computing device 110; and the one or more operating systems and program product one data, product two data, and product three data in central registry 120, may be downloaded to persistent storage 308 through communications unit 312.

I/O interface(s) 314 allows for input and output of data with other devices that may be connected to computing device 110, central registry 120, product one server 114, product two server 116, and product three server 118. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., programs, integrated user interface 113, and user interface program 112 in computing device 110; and the one or more operating systems and program product one data, product two data, and product three data in central registry 120, can be stored on such portable computer-readable storage media and can be loaded onto persistent storage 308 via I/O interface(s) 314. I/O interface(s) 314 also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating an integrated user interface, comprising the steps of:
   a computer receiving via the integrated user interface a first user selection of at least a first product and a second product, wherein the first product is a first application including a first product server and the second product is a second application including a second product server;
   in response to receiving the first user selection of at least the first product and the second product, receiving by the computer a second user selection comprising user selected content associated with the first product and the second product;
   in response to receiving the second user selection comprising the user selected content, querying by the computer a central registry to identify resources that include first configuration content associated with the first product based on first product data from the first product server, and second configuration content associated with the second product based on second product data from the second product server;
   based on the identified resources that include the first configuration content and the second configuration content, the computer determining a dependency relationship between the first product and the second product;
   the computer retrieving the identified resources that include the first configuration content associated with the first product and the second configuration content associated with the second product based on the user selected content and the dependency relationship, wherein the identified resources that include the first configuration content and the second configuration content comprises uniform resource locators (URLs) for each of the first product and the second product;
   the computer consolidating the retrieved identified resources that include the first configuration content of the first product with the retrieved identified resources that include the second configuration content of the second product, wherein consolidating includes simultaneously displaying on the integrated user interface the retrieved identified resources that include the first configuration content that is associated with the first application with the retrieved identified resources that include the second configuration content that is associated with the second application.

2. The method of claim 1, further comprising the steps of:
   the computer receiving user access information for a user by receiving a user login;
   and
   the computer determining that the user access information allows access to the retrieved identified resources.

* * * * *